United States Patent [19]
Nakaoka et al.

[11] Patent Number: 6,001,194
[45] Date of Patent: Dec. 14, 1999

[54] BIAS MATERIAL, MAGNETIC MARKER AND METHOD OF PRODUCING THE BIAS MATERIAL

[75] Inventors: Noriyuki Nakaoka, Yasugi; Tsutomu Inui, Yonago; Akira Kawakami, Matsue, all of Japan

[73] Assignee: Hitachi Metals, Ltd., Tokyo, Japan

[21] Appl. No.: 09/069,115

[22] Filed: Apr. 29, 1998

[30] Foreign Application Priority Data

Apr. 30, 1997 [JP] Japan .................................... 9-112259

[51] Int. Cl.⁶ ................................................... H01F 1/047
[52] U.S. Cl. ............................ 148/306; 420/82; 420/89; 340/572
[58] Field of Search .................................. 148/306, 320, 148/332; 420/82, 89; 340/572

[56] References Cited

U.S. PATENT DOCUMENTS

| 3,938,125 | 2/1976 | Benassi . | |
|---|---|---|---|
| 4,481,045 | 11/1984 | Watanabe | 148/101 |
| 5,192,375 | 3/1993 | Sawa et al. | 148/306 |
| 5,565,849 | 10/1996 | Ho et al. | 340/572 |
| 5,662,748 | 9/1997 | Mizoguchi et al. | 148/332 |

FOREIGN PATENT DOCUMENTS

| B2-6-10307 | 2/1994 | Japan . |
| B2-6-10308 | 2/1994 | Japan . |
| 8-60312 | 3/1996 | Japan . |
| 8-87237 | 4/1996 | Japan . |
| 96/32518 | 10/1996 | WIPO . |

*Primary Examiner*—John Sheehan
*Attorney, Agent, or Firm*—Sughrue, Mion, Zinn, Macpeak & Seas, PLLC

[57] ABSTRACT

A bias material for magnetic markers is produced by plastic working to provide a strip form, which has a metal structure consisting of the iron-base matrix and a non-magnetic copper group metal phase in an amount of not less than a solubility limit thereof in an equilibrium state at a room temperature. The non-magnetic copper group metal phase is dispersed in the matrix so as to form a microstructural rod pattern. The bias material comprises preferably 3 to 35% wt % of a copper group metal. The magnetic marker is produced by combining the bias material and a magnetostriction element.

10 Claims, 4 Drawing Sheets

FIG.1A

|—————|
10 μm

|—————|
5 μm

FIG.4

BIAS MATERIAL, MAGNETIC MARKER AND METHOD OF PRODUCING THE BIAS MATERIAL

BACKGROUND OF THE INVENTION

1. Field of the Invention

The present invention relates to a bias material for magnetic markers for applying a bias magnetic field to a metal piece (hereafter called a magnetostriction element) which oscillates under the magnetostriction effect, a magnetic marker, and a method of producing a bias material for magnetic markers.

2. Description of Related Art

Some electronic monitoring systems have been proposed, by which magnetic labels attached to commodities are detected as markers for a purpose of preventing theft or watching a transferring flow or kinds of commodities, goods or articles. Among such systems, there is a system in which markers are made from a magnetostriction material.

For example, JP-A-8-60312 (EP702096A1) teaches to use an amorphous magnetostriction material as a marker. Particularly, JP'312 discloses a system according to which a magnetostriction element made of a specific amorphous metal is detected by a pickup coil by way of causing the magnetostriction element to resonate within an alternating magnetic field so as to vary the magnetic field.

WO-96/32518 (USP5628840) and JP-A-8-87237 teach, respectively, a magnetic marker which is a combination of a magnetostriction material and a bias material which exerts a preliminary magnetic field (or a bias magnetic field) on the magnetostriction material. The magnetic marker taught in the publications is preliminarily provided with a bias magnetic field so that the magnetostriction material mechanically resonates under exertion of an alternating magnetic field.

According to such magnetic marker in which the bias material is made of a semi-hard magnetic material by which a magnetostriction element for a marker is exposed to a bias magnetic field, the marker can be inactivated by demagnetizing the bias material without removing it from a commodity or article.

Thus, if markers are inserted into or attached to commodities or articles, they can be distinguished from one another by way of inactivating the magnetic markers being attached to the commodities when paying therefor, which are those properly purchased and those intended to illegally bring out from a shop, the latter commodities carrying active magnetic markers.

In such electronic monitoring systems, a selection of the bias material for applying a bias magnetic field to the magnetostriction material is important as well as a selection of the magnetostriction material for markers.

The bias material is required to have a higher coercive force than the magnetostriction material so as not to be demagnetized by the magnetostriction material, and must be magnetizable and demagnetizable.

As magnetizable and demagnetizable materials, there have been known Fe—Cr—Co semi-hard magnetic materials represented by an Fe—25Cr—10Co alloy (by weight percent), which are used for lead relays and other applications.

Although Fe—Cr—Co alloys have been used also as bias materials, they are expensive because of a large amount of Co, which have coercive force of as high as 7,200 A/m, residual magnetic flux density (Br) of about 1.1 T, and remanence ratio (Br/B8,000), which is a ratio of magnetic flux density at an imparted magnetic field of 8,000 A/m (saturated magnetic flux density (B8,000)) to residual magnetic flux density (Br), is as relatively low as about 0.8.

As mentioned above, the bias material is a material which can be magnetized and demagnetized, and if its coercive force is too high, it is difficult to demagnetize. If the bias material is not fully demagnetized, the electronic monitoring system may be operated erroneously.

Similarly, if the remanence ratio and magnetization steepness are unsatisfactory in the B-H curve, the boundary between magnetized and demagnetized states is unclear also resulting in erroneous operation.

The term "magnetization steepness" (or steep rise and fall magnetization property) used herein is the property of radical or abrupt change in the magnetized state when the bias material is magnetized or demagnetized, and the B-H curve of materials which is significant or excellent in magnetization steepness have a generally rectangular form.

It is determined as follows whether or not the magnetization steepness is significant or excellent.

In general, it has been believed that a semi-hard magnetic material reaches a saturated magnetic flux density when a magnetic field of five times the coercive force of the material is applied. This magnetic flux density is herein called B(5Hc). Further, a magnetic flux density when a magnetic field of 1.5 times the coercive force of the material is applied is called B(1.5Hc), and when the ratio of B(1.5Hc)/B(5Hc) exceeds 0.8, the material is herein determined to have excellent magnetization steepness.

While the residual magnetic flux density is preferably as high as possible for applying a bias magnetic field to the magnetostriction element, that of Fe—Cr—Co alloys is much lower than 2.1T of residual magnetic flux density of pure iron.

The magnitude of the bias magnetic field applied to the magnetostriction element is in proportion to the residual magnetic flux density and the cross-sectional area of the bias material. Also, if the residual magnetic flux density is low, the cross-sectional area of the bias material must be increased, which is not suitable for downsizing the magnetic markers.

SUMMARY OF THE INVENTION

Accordingly, an object of the present invention is to provide an inexpensive bias material for magnetic markers, which has excellent magnetic properties.

Another object of the invention is to provide a magnetic marker using such a bias material.

Still another object of the invention is to provide an suitable method of producing the bias material.

The present inventors examined to look for inexpensive materials each having high residual magnetic flux density and high coercive force required to bias materials for magnetic markers, which can realize a high remanence ratio and excellent magnetization steepness in B-H curves, and has found an Fe-base material which comprises a non-dissolved copper group element.

The basic substance of the invention relates to a bias material for magnetic markers having a structure in which a non-magnetic copper group metal phase is dispersed in the Fe-base matrix.

The invention also relates to a bias material for magnetic markers having a structure in which a non-magnetic copper group metal phase and non-magnetic compound grains are dispersed in the Fe-base matrix.

In the invention, metal carbide grains are preferably dispersed as the non-magnetic grains.

In the invention, 3 to 35% by weight of Cu is preferably contained as the Non-magnetic copper group metal. If the coercive force is too low, magnetization of the bias material is not stable, thus a more preferable lower limit of the Cu content is not less than 5% by weight. If the coercive force is too high, demagnetization of the bias material will become difficult. Thus, a more preferable upper limit of the Cu content is not more than 25% by weight. The Cu content is desirably 8 to 18% by weight.

The bias material for magnetic markers according to the invention has an elongated form such as a strip or a wire as a result of plastic working. A strip form is excellent since a larger cross sectional area than that of a wire form can be obtained while having a small thickness.

In the bias material, the non-magnetic copper group metal phase has is dispersed to form a emicrostructural rod pattern along the longitudinal direction of the bias material.

The bias material has magnetic anisotropy having a longitudinally easier magnetization property relative to that of the transverse direction of the bias material.

The magnetization steepness property of the bias material of the invention may be improved by heat treatment after plastic working.

In order to more effectively utilize magnetic anisotropy, the bias material of the invention is taken from a worked material in parallel to the elongated non-magnetic copper group metal phases.

The term "Fe-base" used herein means that iron comprises trace components including C (carbon), Si, Mn, P, S, Al, N, and/or O (oxygen), and additive elements which can be dissolved in Fe to produce a solid solution. In the invention bias material, since the non-magnetic copper group metal phases have a considerably low solubility in the Fe-base matrix, they are present in the matrix as discrete phases except for a trace amount thereof which is dissolved in the matrix.

The term "dispersion" or "dispersed" used herein does not mean a dispersion in the atomic level, but a presence in the bias material as an "discrete phases."

The bias material for magnetic markers according to the invention may be obtained from a casting consisting of the Fe-base matrix and non-magnetic copper group metal phases dissolved in the matrix in an amount equal to or more than a solubility limit thereof in an equilibrium state at a room temperature, by forming the casting to have an elongated form by way of plastic working.

Alternatively, the bias material for magnetic markers according to the invention may be obtained from a material produced by compacting or sintering mixed powder such as a mixed powder consisting of Fe-base particles and copper group metal particles and subsequent plastic working to get an elongated form.

In the casting method, the non-magnetic copper group metal phases may aggregate in the crystal grain boundaries of the matrix causing cracking during hot working, while in the powder method, the aggregation of the non-magnetic copper group metal phases in the crystal grain boundaries of the matrix can be prevented. Thus, the powder method is preferable.

Alternatively, the bias material for magnetic markers according to the invention may be obtained from a material produced by compacting a pre-alloyed Fe-base metal powder comprising a non-magnetic copper group metal in an amount more than a solubility limit thereof in an equilibrium state at a room temperature, and by forming the bound particles to a strip form by plastic working.

This method is more effective than the method using the mixed powder as the material because the non-magnetic copper group metal phases can be more uniformly dispersed in the matrix.

In order to form an integrated member or article from a pre-alloyed metal powder according to the invention, there are a method of compacting or sintering the metal powder. There is also another method of forming a deposition layer of metal particles as a semi-solidified state according to spray forming.

Specifically, the method in which a metal powder formed by atomizing such as gas-atomizing or water-atomizing is compacted by way of a hot hydrostatic pressing method (hereafter called "HIP").

In order to improve mass productivity, increase in the material size it is effective to use a larger material size. Therefore, hot working is effective in the beginning stage of plastic working. Specifically, forging or hot rolling is preferable.

In order to improve the magnetization steepness of the bias material having a strip or wire form, it is effective for the bias material to have magnetic anisotropy having longitudinally easier magnetization property relative to that of the transverse direction of the strip form. It is preferred to carry out cold working in the final stage of plastic working in order to elongate the dispersed non-magnetic copper group metal phases. Specifically, cold drawing or cold rolling is preferable.

In order to further improve the magnetization steepness of the bias material, it is effective to perform heat treatment after cold working (hereafter called "heat treatment for improving magnetization steepness").

The main factors of interfering rotation of magnetic domains are the dispersed non-magnetic copper group metal phases and metal compounds, which are non-magnetic areas, and strain in the matrix due to plastic working.

The strain in the matrix is relieved by the heat treatment for improving magnetization steepness so as to make rotation of the magnetic domains of the matrix. Thus, the main factors of interfering rotation of the magnetic domains of the matrix are only the dispersed non-magnetic copper group metal phases and metal compounds by which the magnetization steepness is improved.

The heat treatment temperature for improving magnetization steepness is preferably 400 to 700° C. If the heat treatment temperature is too low, strain of the matrix cannot be fully removed. Thus, a more preferable heat treatment temperature is not lower than 450° C. If the heat treatment temperature is too high, the non-magnetic copper group metal phases are coarsened, and the effect of interfering rotation of the magnetic domains of the matrix may not be obtained. Thus, a more preferable heat treatment temperature is not higher than 650° C.

It is preferred, in order to downsize the magnetic markers, that the magnetostriction element and the bias material are formed to be a strip or wire form.

The invention relates to a bias material for magnetic markers, which has a strip form and whose metal structure comprises an amount of 8 to 18% of non-magnetic copper group metal phases being discretely dispersed in a stripe pattern which is parallel to the longitudinal direction of the strip form.

The bias material for magnetic markers of the invention has a ratio of "B(1.5Hc)/B(5Hc)" exceeding 0.8.

The bias material for magnetic markers of the invention can be used in combination with a magnetostriction element as a magnetic marker.

It is preferred that the magnetostriction element and the bias material are formed to be a strip form or a wire form in order to downsize the magnetic markers.

DETAILED DESCRIPTION OF THE INVENTION

One of the important features of the invention is that a material, in which non-magnetic copper group metal phases are dispersed in the Fe-base matrix, was selected as the material for applying a bias magnetic field as described above.

Cu-group elements, i.e. Au, Ag, and Cu, are hardly dissolved in the Fe-base matrix. Thus, the bias material has a structure in which the copper group elements are discrete or separated from the Fe-base matrix.

The term "discrete" used herein means the state wherein a metal structure consists of two phases which are the Fe-base phase and the Cu-group phase.

When a material is magnetized, since the rotation of the magnetic domains of the matrix is prevented by non-magnetic copper group elements present in a dispersed state, the coercive force increases to have semi-hard magnetic property.

Although any of Au, Ag, and Cu may be considered effective as the non-magnetic copper group metal, Cu is preferred because it is the most inexpensive among the copper group elements.

Since the Cu-group metal phase is dispersed in the metal structure to form a microstructural rod pattern, its volume is important than the weight. Thus Cu is more effective because the weight of Cu is less than that of Au and Ag to obtain the same effect.

In the present invention, the content of Cu is 3 to 35% by weight, preferably 5 to 25% by weight, and more preferably 8 to 18% by weight.

If the coercive force of the bias material is excessively small, the magnetized state of the bias material becomes unstable.

For example, there is possibility that after a commodity has been purchased legally and the bias material attached to the commodity has been demagnetized, the bias material may be magnetized again by some magnetic fields, and alarm is activated.

Therefore, in the present invention, the content of Cu is preferably 3% by weight or more.

In order to make the remanence ratio, Br/B8,000, exceed 0.9, the more preferable content of Cu is 5% by weight or more.

In order to achieve the coercive force Hc≧1,600 [A/m], the further preferable content of Cu is 8% by weight or more.

On the other hand, if the coercive force is excessively large, the bias material becomes difficult to demagnetize and the distance from the demagnetizing equipment cannot be increased. Therefore, the demagnetization takes a long time to cause disorder. There will also be cases that the bias material is not demagnetized completely and alarm is activated.

Increasing in the content of Cu may lower the residual magnetic flux density.

In the present invention, therefore, the content of Cu is preferably 35% by weight or less.

In order not to make the remanence ratio, Br/B8,000, be 0.8 or less, the more preferable content of Cu is 25% by weight or less.

In order not to make the residual magnetic flux density be 1.3[T] or less, the more preferable content of Cu is 18% by weight or less.

The bias material of the present invention is advantageous in that a high saturated magnetic flux density of the Fe-base matrix can be utilized as it is by dispersing a Non-magnetic copper group metal in the matrix, and that the coercive force can be controlled by the amount of the dispersed non-magnetic copper group metal.

Also, since the coercive force can be increased by dispersing a non-magnetic compound besides the non-magnetic copper group metal, the control of the coercive force to a desired value becomes easy.

The term "non-magnetic compounds" used herein means, for example, metal sulfides such as MnS, metal oxides such as $Al_2O_3$, or metal carbide such as MoC and NbC.

Since carbon dissolves in an Fe-base matrix, increases the coercive force of the matrix, and combines with other metal elements to form carbides, metal carbides are particularly effective.

Of course, non-magnetic compounds other than those exemplified above may be used.

Elements listed below may be added for controlling the coercive force. It is preferred that such elements are added in the range as follows so that workability will not be deteriorated.

C≦1%, Si≦5%, Mn≦6%,
Co≦10%, Cr≦10%, Ta<5%,
W≦5%, Mo≦5%, Ti≦5%,
V≦5%, Nb≦5%, P≦0.04%, S≦0.03%,
Mg≦5%, Ca≦5%, Al≦5%,
O≦0.5%, N≦0.5%, B≦1%,
Y≦0.5%, rare earth elements ≦0.15%,
Pd≦3%, Pt≦3%, Zr≦0.5%.

Particularly effective elements to form carbide deposited evenly in crystal grains effective for controlling the coercive force are Mo, Ta, W, Nb, or V. However, if the amount added becomes large, workability will lower, the remanence ratio and magnetization steepness will decrease, and properties required for the bias material is deteriorated. Therefore it is preferred to add the above amount of elements.

When the Cu-group dispersed material is subjected to plastic working, anisotropy occurs in the is structure, causing magnetic anisotropy to occur. That is, when the Cu-group metal dispersed in the matrix is elongated by plastic working such as rolling or drawing, a structure in which non-magnetic regions elongated in the length direction is dispersed is formed. When the bias material is magnetized or demagnetized, the non-magnetic regions interfere with the rotation of the magnetic domains, and the length direction becomes the direction easily magnetized.

Figure 1A:
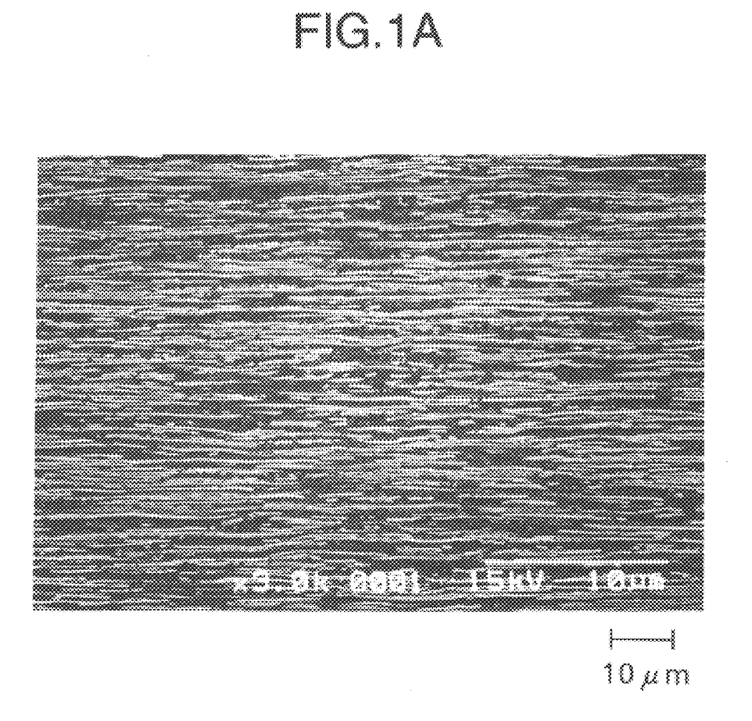
FIG. 1A shows a microstructure of a bias material for magnetic markers according to the invention, which was observed microscopically.
Figure 1B:
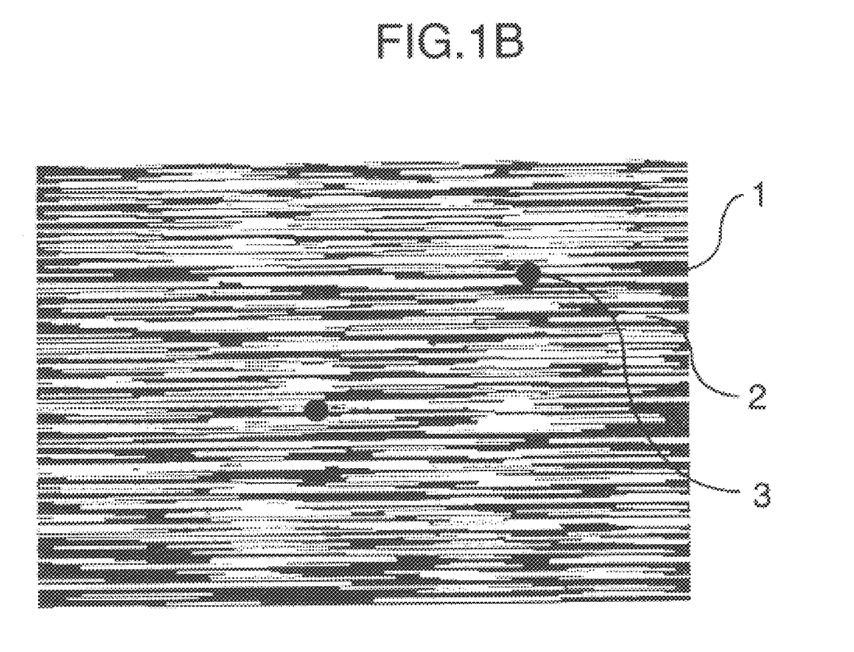
FIG. 1B is a schematic drawing of the microstructure of FIG. 1A.

A structure of the bias material is shown in FIGS. 1A and 1B. FIG. 1A shows the microstructure observed through a scanning electron microscope, and FIG. 1B shows the schematic diagram thereof. As the schematic diagram shows, a non-magnetic copper group metal 2 is dispersed in an Fe-base matrix 1 in the state elongated in the rolling direction. A non-magnetic compound 3 is also observed.

By X-ray analysis, it was confirmed that the black regions were the Fe-base matrix containing Si, Mn, and so on, white regions of rods or needless thus having a microstructural rod pattern were Cu. and spherical black portions were metal carbide grains.

The effective method to make the material planar or linear for imparting magnetic anisotropy to the material is rolling or drawing, and for the reason of the dimensional accuracy and economy, hot rolling or cold rolling is preferred.

The shape of the bias material for magnetic markers according to the present invention may be not only planar, but may be linear having a round, polygonal, or other profiled cross-section.

In order to utilize the magnetic anisotropy described above effectively, it is preferred that the bias material of the present invention is taken in parallel to the non-magnetic region, which is an elongated Cu-group metal, and magnetized in the length direction.

Since the non-magnetic phase is dispersed in the length direction of rolling or drawing, magnetization is easier in the parallel direction than in the vertical direction. It is preferred to cut in the length direction of the bias material and magnetize it in the same direction to use it as the bias material for magnetic markers.

By this, the bias material applies a magnetic field to a magnetostriction element in the length direction. It is preferred that the magnetostriction element has been subjected to heat treatment to arrange the magnetic domains in the width direction. When the bias material is allowed to approach, the magnetic domains of the magnetostriction element having a small coercive force rotate easily, and therefore, resonance occurs mechanically when exposed to the alternating magnetic field of a proper frequency determined by its length.

In the present invention, a method for producing the bias material from a casting is considered the method to obtain the material in the most inexpensive way. The method to cast a molten metal into a mold, or the method of direct continuous casting onto a thin sheet material can be used. The continuous casting is preferred because segregation in the material can be prevented.

By performing working such as rolling or drawing on the material made from a casting, a structure in which non-magnetic regions are dispersed, so as to form a microstructural rod pattern which extends in the length direction, is obtained.

The above-mentioned structure and magnetic behaviors can be obtained not only from a material made from a casting but also from a material made by powder metallurgy.

Although various combinations of powder can be considered, it is preferred to use Fe-base metallic particles, Cu-group non-magnetic metallic particles or particles containing a non-magnetic copper group metal. A structure in which non-magnetic regions are dispersed, so as to form the above mentioned rod pattern, is obtained by performing working such as rolling or drawing on the material produced from the powder by compacting or sintering.

Since the non-magnetic copper group metal element is aggregated on grain boundaries of the matrix when the material is made from a casting, cracking may occur during hot working. On the other hand, cracking can be prevented in the method using powder.

Alternatively, powder containing a non-magnetic copper group metal in an amount equal to or more than the solubility limit thereof in an equilibrium state at normal temperature in an Fe-base matrix can be used.

First, a material to be subjected to plastic working is produced gas atomizing or water atomizing of a molten pre-alloyed metal, which comprises a non-magnetic copper group metal in the Fe-base matrix in an amount of not less than the solubility limit thereof in an equilibrium state at a room temperature. It is compacted, compressed, or sintered (for example, by HIP), or a method in which a molten metal is deposited to form a layer in the semi-solidified state, for example, by spray forming.

The material thus obtained is subjected to rolling or drawing to form a metal structure in which a non-magnetic phase is dispersed in the length direction so as to form a microstructural rod pattern.

This method is more advantageous than the method using a mere mixed powder in that a non-magnetic copper group metal is uniformly dispersed.

The material thus obtained after plastic working has high strain in the matrix. By removing the strain by enough heat treatment, the magnetization steepness is improved.

Figure 2A:
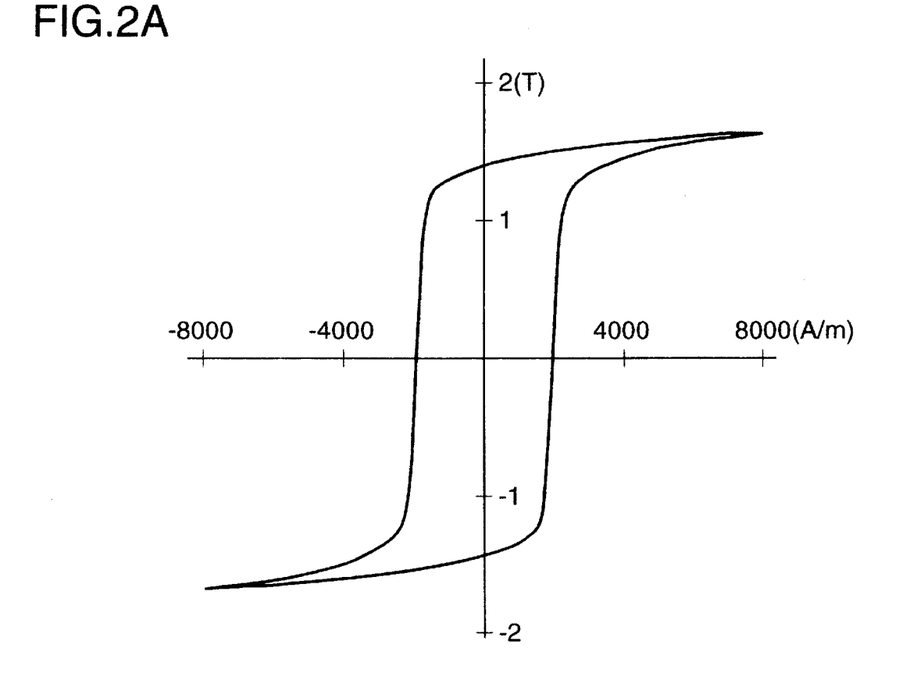
FIG. 2A is a graph of a magnetic property of the bias material as a test result, which was not yet subjected to the heat treatment for improving steep magnetization property.
Figure 2B:
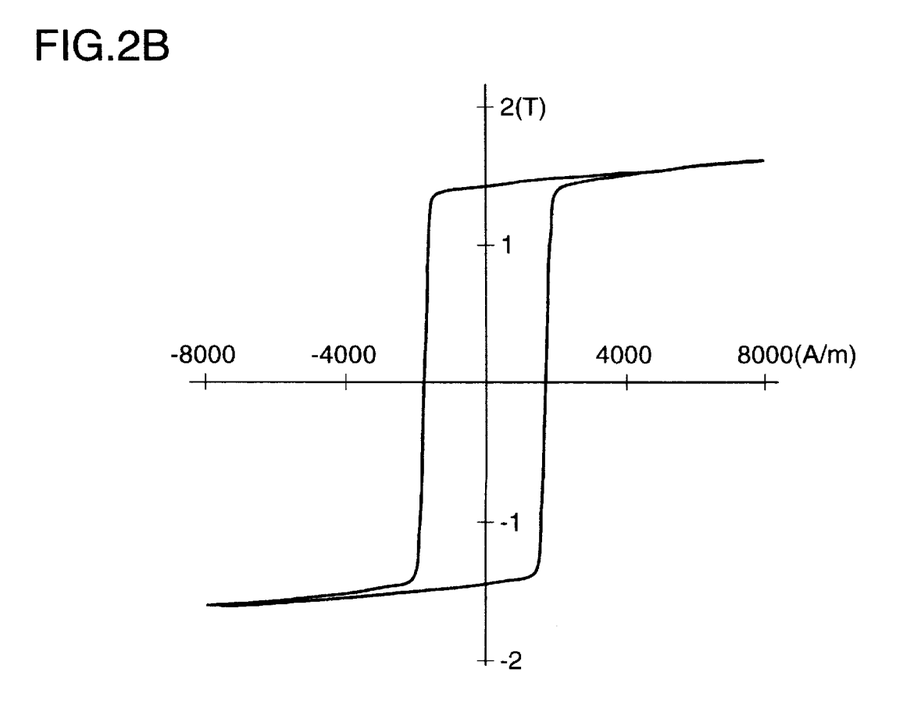
FIG. 2B is a graph of a magnetic property of the bias material as a test result, which was already subjected to the heat treatment for improving steep magnetization property.

FIGS. 2A and 2B show the results of measuring magnetic properties before and after heat treatment for improving steepness, respectively.

The curve of the material prior to heat treatment shown in FIG. 2A is relatively gentle, while the curve of the material after heat treatment shown in FIG. 2B is nearly rectangular.

B(1.5Hc)/B(5Hc), which represents magnetization steepness, is about 0.8 before heat treatment, while it was improved to about 0.9 after heat treatment.

Thus, only magnetization steepness can be improved significantly without greatly affecting the saturated magnetic flux density or the coercive force.

Although this heat treatment for improving steepness can be performed before or after the process for cutting the bias material without producing large difference in effectiveness, it is preferred from the point of view of productivity to perform before the cutting process so as to be subjected to continuous heat treatment.

As described above, the bias material for magnetic marker of a thin sheet form taken in parallel to the non-magnetic copper group metal phase elongated and dispersed, so as to form the microstructural rod pattern, can be obtained.

By taking in parallel to the non-magnetic copper group metal phase elongated and dispersed stringly, and by heat treatment for improving steepness, a bias material of B(1.5Hc)/B(5Hc)≧0.8 is obtained. When 8 to 18% by weight of Cu is contained, B(1.5Hc)/B(5Hc)≧0.9 is easily realized.

From various points of view, such as magnetic properties including remanence ratio, coercive force, and hot and cold workability other than magnetization steepness, the most preferred content of Cu is 8 to 18% by weight.

In the present invention, a magnetic marker can be produced by combining a magnetostriction element and a bias material.

As the material for magnetostriction elements, for example, Fe—Co or Fe—Ni—Mo amorphous metal materials have been known. The magnetostriction element consisting of these materials is oscillated mechanically by alternating magnetic fields of resonance frequency determined by the length of the magnetostriction element under the state preliminarily magnetized to about 300 to 800 A/m by the bias material. For example, when the resonance frequency is established between 50 and 60 kHz, the length of the magnetostriction element is between about 20 mm and about 50 mm.

The magnitude of the magnetic field impressed on the magnetostriction element by the bias material is determined by the residual magnetic flux density of the bias material, the cross-sectional area of the bias material, and the distance between the bias material and the magnetostriction element. Since the bias material according to the present invention has a high residual magnetic flux density, the cross-sectional area can be small when a bias magnetic field is impressed to the magnetostriction element, which is also effective to the downsizing of the magnetic marker.

It is preferable that the magnetostriction element is planar or linear to fit the shape of the bias material. It is more preferable that both bias material and the magnetostriction element are planar because they can be made small and thin.

EXAMPLE

The bias materials Nos. 1 through 16 according to the present invention were produced by the following casting method.

After prepared an alloy melt having a desired composition in a melting furnace, the melt was cast to an ingot to obtain the material. Although some materials cracked during forging, the parts free of cracking were processed to a thickness of 5 mm. Then, softening annealing and cold rolling were repeated to obtain thin sheet materials of a thickness of 50 μm.

Comparative Example 31 was also produced in the same manner.

The bias materials Nos. 51 through 66 according to the present invention were produced by the following powder method.

First, each melt of the materials was prepared to have a desired composition in a melting furnace, then a powder of spherical particles was obtained by the gas atomizing method. According to X-ray analysis, each of the metal powders contains the non-magnetic copper group metal in the Fe-base matrix in an amount of more than the solubility limitation thereof in an equilibrium state at a room temperature.

Next, the powder under 16 mesh (or minus 16 mesh) obtained by screening was filled in a soft steel can for HIP made from a mild steel having a width of 100 mm, a thickness of 40 mm and a length of 200 mm, heated and degassed, and sintered by the HIP method at a temperature of 950° C. and a pressure of 1,500 atm for one hour. The sintered material was hot-rolled to have a thickness of 15 mm, and the can was removed by machining. Then after softening annealing at 850° C. for one hour, the material was hot-rolled to have a thickness of 5 mm. Then, softening-annealing and plastic working by cold rolling were repeated to obtain thin sheet materials of a thickness of 50 μm.

Comparative Example 81 was also produced in the same manner.

Table 1 shows the compositions of the bias materials produced according to the present invention.

TABLE 1

| Specimen No. | Chemical composition (wt %) | Type of production | Type of specimen |
|---|---|---|---|
| 1 | Fe—1.5Cu | Casting | Invention |
| 2 | Fe—3.0Cu | " | " |
| 3 | Fe—3.0Cu—8Cr | " | " |
| 4 | Fe—6.0Cu | " | " |
| 5 | Fe—9.0Cu | " | " |
| 6 | Fe—9.0Cu—0.5Al—0.05O* | " | " |
| 7 | Fe—9.0Cu—0.5C—1Mo | " | " |
| 8 | Fe—9.0Cu—5Cr | " | " |
| 9 | Fe—9.5Cu | " | " |
| 10 | Fe—9.5Cu—5Cr | " | " |
| 11 | Fe—15.0Cu | " | " |
| 12 | Fe—18.0Cu | " | " |
| 13 | Fe—24.0Cu | " | " |
| 14 | Fe—27.0Cu | " | " |
| 15 | Fe—34.0Cu | " | " |
| 16 | Fe—37.0Cu | " | " |
| 31 | Fe—26Cr—10Co | " | Comparative |
| 51 | Fe—1.5Cu | Powder | Invention |
| 52 | Fe—4.0Cu | " | " |
| 53 | Fe—4.0Cu—0.3C—1Mo | " | " |
| 54 | Fe—7.0Cu | " | " |
| 55 | Fe—7.0Cu—1C—3Mo | " | " |
| 56 | Fe—9.5Cu | " | " |
| 57 | Fe—9.5Cu—0.5Al—0.05O* | " | " |
| 58 | Fe—9.5Cu—0.5C—1W | " | " |
| 59 | Fe—9.5Cu—0.5C—1Mo | " | " |
| 60 | Fe—15.0Cu | " | " |
| 61 | Fe—15.0Cu—0.5C—0.2Nb | " | " |
| 62 | Fe—23.0Cu | " | " |
| 63 | Fe—24.0Cu—0.5C—1Mo | " | " |
| 64 | Fe—27.0Cu | " | " |
| 65 | Fe—34.0Cu | " | " |
| 66 | Fe—37.0Cu | " | " |
| 81 | Fe—26Cr—10Co | " | Comparative |

Note 1: "Casting" means "Casting Method".
Note 2: "Powder" means "Powder Method" in which a starting material is a powder.
Note 3: "Invention" means "Invention Example (or specimen)"
Note 4: "Comparative" means "Comparative Example (or specimen)"
Note 5: The symbol "*" attached to "0.50O" means "0.05% oxygen".

The bias materials for magnetic markers were obtained from each of the thin sheet materials produced in the above processes so as to have a longitudinal direction parallel to the dispersed Cu phase being elongated in the rolling direction.

The magnetic properties were measured, after heat treatment for improving steepness at a temperature between 400 and 700° C. for 30 minutes.

Table 2 shows the results of measuring the magnetic properties.

TABLE 2

| Specimen No. | Chemical composition (wt %) | Coercive force (Hc) A/m | Residual Magnetic flux density Br (T) | Br/B8000 | B(1.5 Hc)/B(5 Hc) |
|---|---|---|---|---|---|
| 1 | Fe—1.5Cu | 520 | 1.71 | 0.88 | 0.93 |
| 2 | Fe—3.0Cu | 890 | 1.68 | 0.87 | 0.94 |
| 3 | Fe—3.0Cu—8Cr | 950 | 1.50 | 0.86 | 0.90 |
| 4 | Fe—6.0Cu | 1370 | 1.63 | 0.91 | 0.92 |
| 5 | Fe—9.0Cu | 1620 | 1.62 | 0.91 | 0.93 |
| 6 | Fe—9.0Cu—0.5Al—0.05O* | 1730 | 1.54 | 0.89 | 0.92 |
| 7 | Fe—9.0Cu—0.5C—1Mo | 1650 | 1.57 | 0.91 | 0.92 |
| 8 | Fe—9.0Cu—5Cr | 1920 | 1.51 | 0.85 | 0.95 |
| 9 | Fe—9.5Cu | 1580 | 1.62 | 0.91 | 0.96 |
| 10 | Fe—9.5Cu—5Cr | 1920 | 1.51 | 0.85 | 0.91 |
| 11 | Fe—15.0Cu | 1920 | 1.62 | 0.88 | 0.93 |
| 12 | Fe—18.0Cu | 3850 | 1.32 | 0.82 | 0.91 |
| 13 | Fe—24.0Cu | 5300 | 1.24 | 0.81 | 0.90 |
| 14 | Fe—27.0Cu | 6100 | 1.12 | 0.81 | 0.88 |
| 15 | Fe—34.0Cu | 6450 | 1.08 | 0.80 | 0.87 |
| 16 | Fe—37.0Cu | 6720 | 1.06 | 0.79 | 0.85 |
| 31 | Fe—26Cr—10Co | 7200 | 1.08 | 0.78 | 0.78 |
| 51 | Fe—1.5Cu | 520 | 1.72 | 0.85 | 0.93 |
| 52 | Fe—4.0Cu | 980 | 1.67 | 0.88 | 0.93 |
| 53 | Fe—4.0Cu—0.3C—1Mo | 1160 | 1.62 | 0.84 | 0.92 |
| 54 | Fe—7.0Cu | 1250 | 1.60 | 0.91 | 0.93 |
| 55 | Fe—7.0Cu—1C—3Mo | 1550 | 1.63 | 0.91 | 0.92 |
| 56 | Fe—9.5Cu | 1640 | 1.62 | 0.91 | 0.95 |
| 57 | Fe—9.5Cu—0.5Al—0.05O* | 1690 | 1.60 | 0.89 | 0.92 |
| 58 | Fe—9.5Cu—0.5C—1W | 1750 | 1.58 | 0.87 | 0.93 |
| 59 | Fe—9.5Cu—0.5C—0.2Nb | 1770 | 1.59 | 0.88 | 0.93 |
| 60 | Fe—15.0Cu | 1880 | 1.45 | 0.90 | 0.90 |
| 61 | Fe—15.0Cu—0.5C—0.2Nb | 2470 | 1.42 | 0.84 | 0.89 |
| 62 | Fe—23.0Cu | 3630 | 1.25 | 0.82 | 0.88 |
| 63 | Fe—24.0Cu—0.5C—1Mo | 5480 | 1.22 | 0.83 | 0.87 |
| 64 | Fe—27.0Cu | 5810 | 1.20 | 0.80 | 0.87 |
| 65 | Fe—34.0Cu | 6270 | 1.15 | 0.80 | 0.86 |
| 66 | Fe—37.0Cu | 6550 | 1.13 | 0.79 | 0.85 |
| 81 | Fe—26Cr—10Co | 6850 | 1.14 | 0.76 | 0.77 |

Note:
The symbol "*" attached to "0.05O" means "0.05% oxygen".

As Table 2 shows, it is found that the coercive force and the residual magnetic flux density of the bias materials Nos. 1 through 16 and Nos. 51 through 66 according to the present invention can be adjusted by the amount of Cu. By changing the amount of Cu from 3 to 35%, bias materials of Hc of 800 to 6,550 A/m can be obtained. And the remanence ratio and the magnetization steepness in B-H curve of them are equal to or more than 0.8. i.e. Br/B8,000≧0.8 and B(1.5Hc)/B(5Hc)≧0.8.

The microstructure of a bias material of the invention was observed through a scanning electron microscope.

The microstructure of a bias material having the chemical composition according to the present invention has a structure in which the non-magnetic copper group metal phase is dispersed in an Fe-base matrix to form the microstructural rod pattern. For example, in the specimens to which a carbide forming element was added such as the bias material No. 7, the presence of MoC was confirmed among the non-magnetic compounds.

Figure 3A:
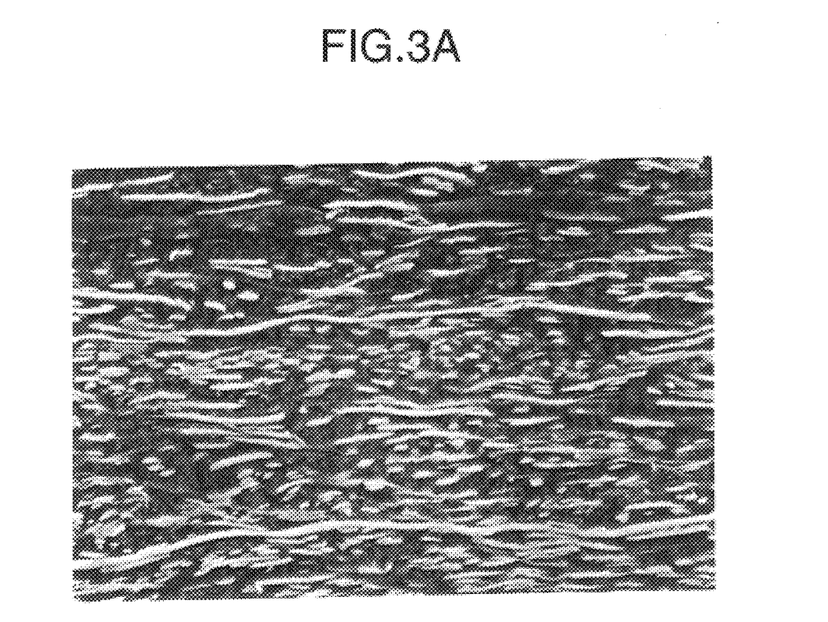
FIG. 3A shows a microstructure of a bias material (Fe—15Cu) made from a casting according to the invention, which was observed microscopically.
Figure 3B:
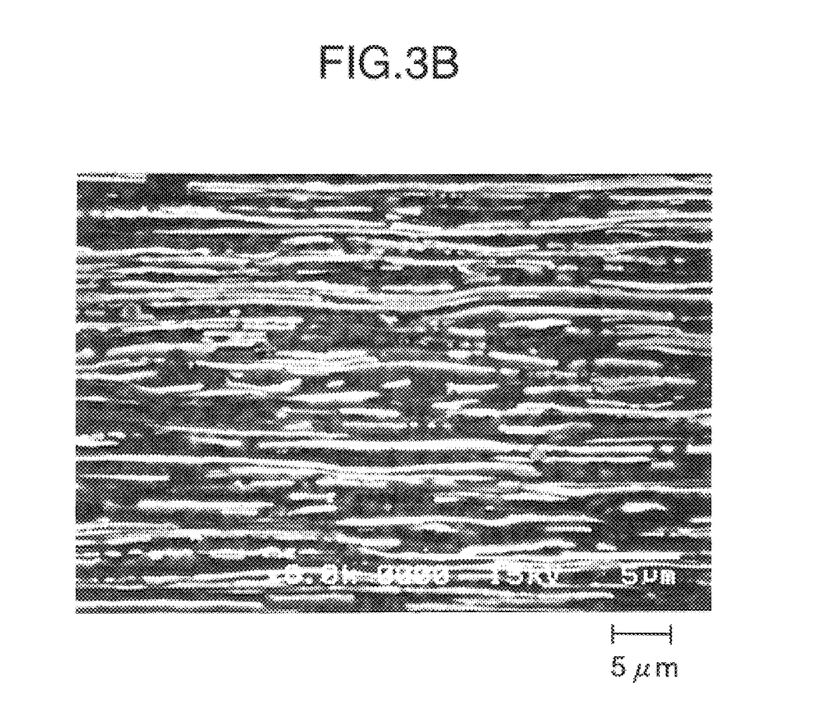
FIG. 3B shows a microstructure of a bias material (Fe—15Cu) made by the powder method according to the invention, which was observed microscopically.

Examples of the microstructure are shown in FIGS. 3A and 3B. FIG. 3A shows the microstructure of the bias material No. 11 produced by the casting method, and FIG. 3B shows the microstructure of the bias material No. 60 produced by the powder method.

In either example, a dispersed and elongated Cu phase can be seen as a white rod or needle pattern in the black Fe-base matrix. The lateral direction of the photograph is the length direction of the bias material, i.e. the length direction of cold rolling. It is found that the material has magnetic anisotropy because the strings of Cu is laterally elongated and oriented in the length direction of cold rolling.

Actually, the specimens being cut in the width direction of cold rolling (i.e. vertically relative to the elongated Cu phase, have much better magnetization steepness than that of the specimen being cut in the length direction of cold rolling, i.e. in parallel to the elongated Cu.

Although no significant differences in the saturated magnetic flux densities and the coercive forces were found, but the magnetization steepness of the specimens cut in parallel excelled decisively, and the B(1.5Hc)/B(5Hc) of the bias material No. 9 of the invention was 0.19 for the vertical material and 0.92 for the parallel material.

The bias material of the invention was combined with a metal piece which oscillates due to magnetostriction called a magnetostriction element to produce a magnetic marker.

Figure 4:
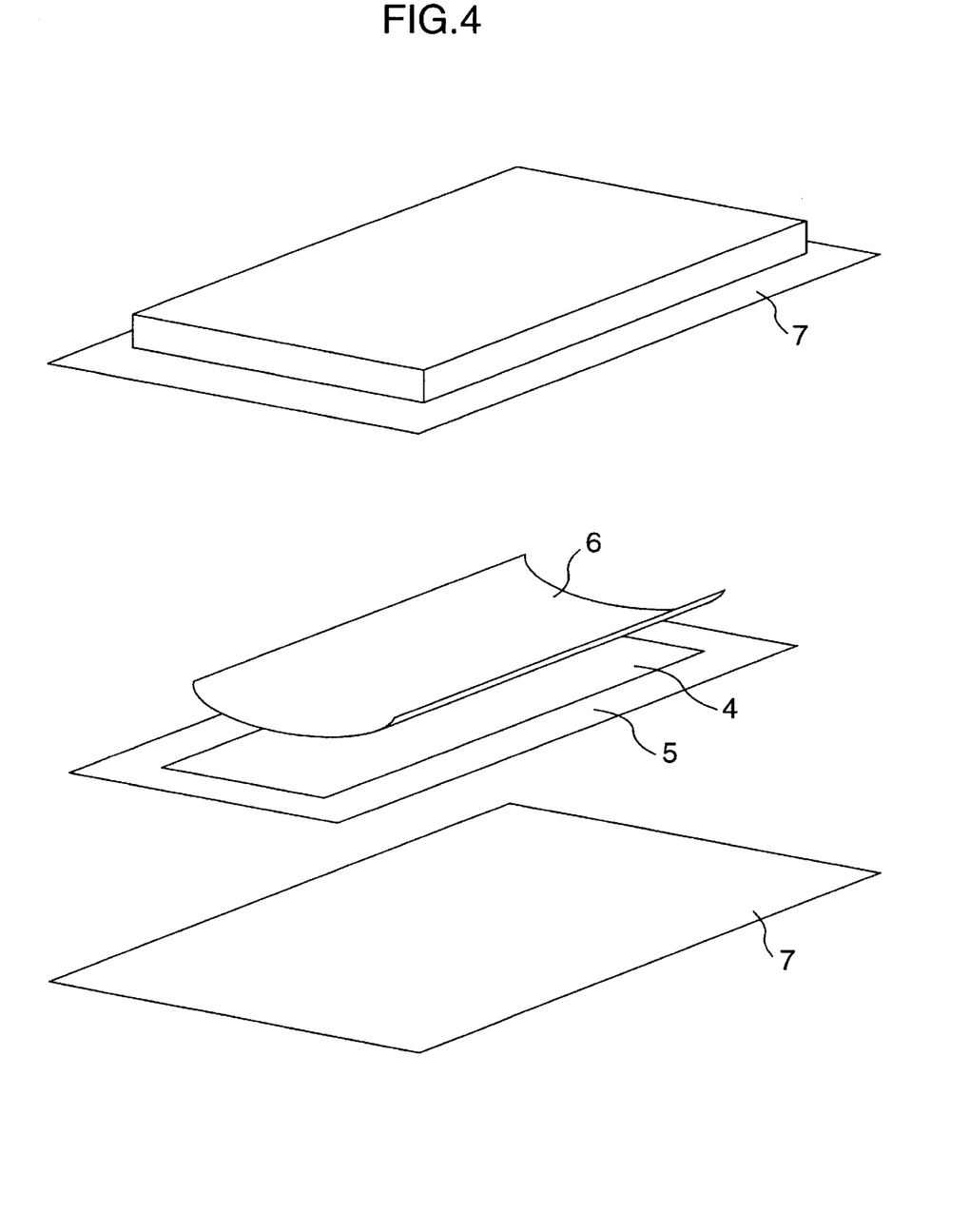
FIG. 4 is a schematic perspective view of components of a magnetic marker comprising a bias material of the invention.

FIG. 4 shows a schematic diagram of an example of the magnetic marker according to the invention.

A pack 5 produced by holding a magnetized bias material 4 with a resin material is allowed to approach to a magnetostriction element 6 as FIG. 4 shows and put in a case 7 to form a magnetic marker. This magnetic marker is used by inserting in or attached to goods.

According to the invention, sufficient coercive force and high residual magnetic flux density, and high remanence ratio and steepness in B-H curves can be obtained as a bias material for magnetic markers by using an Fe—Cu-group-based material. And the bias material is inexpensive since no expensive materials such as Co is required. This is advantageous for markers not to be removed from commodities or articles.

What is claimed is:

1. A magnetic marker comprising a magnetostriction element and a bias material which exerts a bias magnetic field on said magnetostriction element, said bias material having a metal structure in which non-magnetic copper group metal phases are dispersed in an iron-base matrix.

2. A magnetic marker according to claim 1, in which said magnetostriction element has a strip form.

3. A magnetic marker according to claim 1, in which said bias material further comprises dispersed non-magnetic compound grains.

4. A magnetic marker according to claim 3, in which said non-magnetic compound is a metal carbide.

5. A magnetic marker according to claim 1, in which said bias material consists essentially of 3 to 35 wt % of a copper group metal with the balance being substantially Fe.

6. A magnetic marker according to claim 5, in which said bias material consists essentially of 8 to 18 wt % of a copper group metal with the balance being substantially Fe.

7. A magnetic marker according to claim 1, in which said bias material has an elongated form.

8. A magnetic marker according to claim 1, in which said dispersed non-magnetic copper group metal has a microstructural rod pattern and is oriented along the longitudinal direction of the bias material.

9. A magnetic marker according to claim 8, in which said bias material has magnetic anisotropy having a longitudinally easier magnetization property relative to that of the transverse direction of the bias material.

10. A magnetic marker according to claim 8, in which said bias material consists essentially of 8 to 18 wt % of a copper group metal with the balance being substantially Fe and has a ratio of "B(1.5Hc)/B(5Hc)" exceeding 0.8 in the longitudinal direction, where the value "B(B1.5Hc)" is a magnetic flux density when the bias material is exposed in a magnetic field of 1.5 times the coercive force of the bias material and the value "B(5Hc)" is a magnetic flux density when the bias material is exposed in a magnetic field of 5 times the coercive force of the bias material.

* * * * *